United States Patent
Paulsen et al.

[11] Patent Number: 5,246,407
[45] Date of Patent: Sep. 21, 1993

[54] AUTOMATIC SELECTOR OF A MOTOR VEHICLE EPICYCLIC CHANGE-SPEED GEARBOX

[75] Inventors: Lutz Paulsen, Essingen; Alfons Müller, Rheinhausen; Claus Bormann, Stuttgart, all of Fed. Rep. of Germany

[73] Assignee: Mercedes-Benz AG, Fed. Rep. of Germany

[21] Appl. No.: 908,225

[22] Filed: Jul. 6, 1992

[51] Int. Cl.⁵ .............................................. F16H 3/58
[52] U.S. Cl. .................................................. 475/129
[58] Field of Search ............................. 475/129, 128

[56] References Cited

U.S. PATENT DOCUMENTS 3,754,483  8/1973  Edmunds ............................ 475/129
3,951,011  4/1976  Lemon ............................ 475/129 X

FOREIGN PATENT DOCUMENTS 2321352  11/1974  Fed. Rep. of Germany .
1427113   3/1976  United Kingdom .
2106602   4/1983  United Kingdom .

Primary Examiner—Dirk Wright
Attorney, Agent, or Firm—Evenson, McKeown, Edwards & Lenahan

[57] ABSTRACT

In an automatic selector device of an epicyclic change-speed gearbox, a frictional connection, i.e. a clutch or brake, participating in the selection of a forward gear is engaged by a pressure medium setting element and disengaged by a spring device. In a neutral selection condition, a partial quantity of the pressure medium filling of the selector setting element is accommodated in a pressure reservoir so that the friction surfaces are just unloaded and does not transmit torque.

6 Claims, 2 Drawing Sheets

AUTOMATIC SELECTOR OF A MOTOR VEHICLE EPICYCLIC CHANGE-SPEED GEARBOX

CROSS-REFERENCE TO RELATED APLICATIONS

This application is related to application Ser. No. 07/914,536 filed on Jul. 17, 1992 in the name of Lutz Paulsen for AUTOMATIC SELECTOR DEVICE FOR A MOTOR VEHICLE CHANGE-SPEED GEARBOX; based upon an application filed in Germany on Jul. 23, 1991 having Ser. No. P 41 24 385.4, and application Ser. No. 07/917,171 filed on Jul. 23, 1992 in the name of Alfons Müller for AUTOMATIC SELECTOR DEVICE OF A CHANGE-SPEED GEARBOX OF A MOTOR VEHICLE; based upon an application filed in Germany on Jul. 23, 1991 having Ser. No. P 41 24 384.6, the subject matter of which is incorporated herein by reference.

BACKGROUND AND SUMMARY OF THE INVENTION

The present invention concerns a selector device, and, more particularly, to an automatic selector device of a motor vehicle epicyclic change-speed gearbox, in which a frictional connection, i.e. a clutch or brake, participating in the selection of a gear can be engaged by a pressure medium selector setting element of the axial piston type but can be disengaged by a spring device to ensure a clearance between the friction surfaces in the rest condition. A working pressure conduit starting from the selector setting element, a reservoir pressure conduit starting from a pressure reservoir, a working pressure intermediate conduit starting from a 3/2-way selector valve and connected to a controller pressure conduit and a pressure-relieved return are connected to a disengagement control valve in which two positions can be selected. The intermediate conduit is connected to the controller pressure conduit in the gear position of the selector valve associated with the selection of the gear and is connected to the return in the deselection position of the selector valve corresponding to the deselection of the gear, and the working pressure conduit is connected, on one hand, to the intermediate conduit in one position of the disengagement control valve and, on the other hand, is shut off from the intermediate conduit in the other position of the disengagement control valve.

In a known selector device of the type shown in German Offenlegungsschrift No. 23 21 352, the selector setting element of a plate clutch participating in the selection of the third gear is connected to the intermediate conduit by a bypass conduit starting from the working pressure conduit via a non-return valve opening in the direction of the selector setting element while bypassing the disengagement control valve. The reservoir pressure conduit is itself connected to the bypass conduit via a throttle so that the pressure reservoir is charged from the intermediate conduit via the bypass conduit when the clutch is engaged. A control pressure conduit branches off from the reservoir pressure conduit and is connected, together with a second control pressure conduit carrying a control pressure which is a function of the vehicle speed, to the disengagement control valve.

Although the intermediate conduit of this known selector device is connected to the return of the selector valve if the associated control valve is switched into its position for the second gear, the selector setting element of the clutch is nevertheless cut off from the return by the non-return valve and by the disengagement control valve until a gear brake participating in the selection of the second gear is more or less engaged, with the pressure reservoir emptying via the bypass conduit to the return of the selector valve and the selector setting element emptying via the disengagement control valve to the return of the selector valve. In this configuration, a transfer of pressure medium from the selector setting element into the pressure reservoir is neither intended nor possible.

In order to reduce the fuel consumption of city buses with an epicyclic change-speed gearbox, an attempt is made to switch the gearbox to "neutral" automatically each time the vehicle comes to rest so that the engine is no longer loaded when idling and thus the fuel injection quantity is reduced. Because the vehicle spends a large proportion of its time at rest in city center stop-and-go traffic due to traffic and bus stops, and also the driver cannot be expected to actuate the neutral button at every stop, the potential for achieving savings is substantial.

Although there are no problems with an automatic selection of neutral on a level roadway, the danger of rolling back occurs during stops on gradients if, in order to move off, the driver removes his foot from the brake pedal and presses the accelerator. This is because a frictional connection has to be engaged in the gearbox in order to reestablish the force path. It is then important to keep the filling procedure of the relevant selector setting element as short as possible.

A frictional connection, which has to transmit an excessive torque in driving operation, sometimes has to be released in "neutral" in the case of an epicyclic change-speed gearbox. A clutch for the introduction of the drive torque in the forward gears, which could theoretically also be used for the automatic selection of the neutral position, must not be unloaded in those cases in which this clutch forms a structural unit with a clutch for the introduction of the drive torque in reverse gear. Because of the centrifugal force of its actuating medium, this clutch would engage. Since the frictional connection transmitting an excess torque in one gear is relieved of load in other gears, it is necessary to ensure an adequate clearance between the friction surfaces in order to avoid high drag losses when the vehicle is at rest.

In the unloaded condition, the return of the actuating piston of the frictional connection is ensured by return springs. When the frictional connection is selected, the piston space must first be refilled before all the plates come into contact with one another and torque can be transmitted. The pressure supplied during his filling procedure must not be too large so that, when it is finished and, because the pressure drop is no longer present, the pressure in the selector setting element climbs to the same level as the pressure supplied no excessively large torque is transmitted by the frictional connection. As a result of the relatively low pressure supplied, however, the filling procedure last too long and the vehicle can roll back as previously discussed.

An object of the invention is to reduce the selection period of the frictional connection when selecting from neutral to such an extent that, when starting on a hill, the vehicle does not roll back to any noticeable extent and, at the same time, sufficient plate clearance is ensured in the frictional connection in normal driving operation in other gears.

The foregoing objects have been achieved in an advantageous manner in accordance with the present invention by providing that in a neutral selection condition cancelling the torque transmission in the change-speed gearbox, the selector valve is in its gear position and the disengagement control valve is in its disengagement position shutting off the working pressure conduit from the intermediate conduit. The disengagement control valve is still connected to a pressure-relieved return and, via the working pressure conduit, is exclusively connected to the selector setting element and, via the reservoir pressure conduit, is exclusively connected to the pressure reservoir. The reservoir pressure conduit is, on one hand, connected to the working pressure conduit in the disengagement position of the disengagement control valve but, on the other hand, is connected to the return in the gear position of the disengagement control valve, and the volume of the pressure reservoir is matched to the volume, occurring in the engaged position, of the working pressure chamber of the selector setting element such that, when the working pressure conduit is connected to the reservoir pressure conduit via the disengagement control valve, the selector setting element can only be disengaged to the extent that the frictional connection is just unloaded and does not transmit torque.

In the selector device according to the present invention, an additional pressure reservoir is provided which can be connected via the disengagement control valve.

BRIEF DESCRIPTION OF THE DRAWINGS

These and other objects, features and advantages of the present invention will become more readily apparent from the following detailed description of a currently preferred embodiment when taken in conjunction with the accompanying drawings wherein.

DETAILED DESCRIPTION OF THE DRAWINGS

Figure 1:
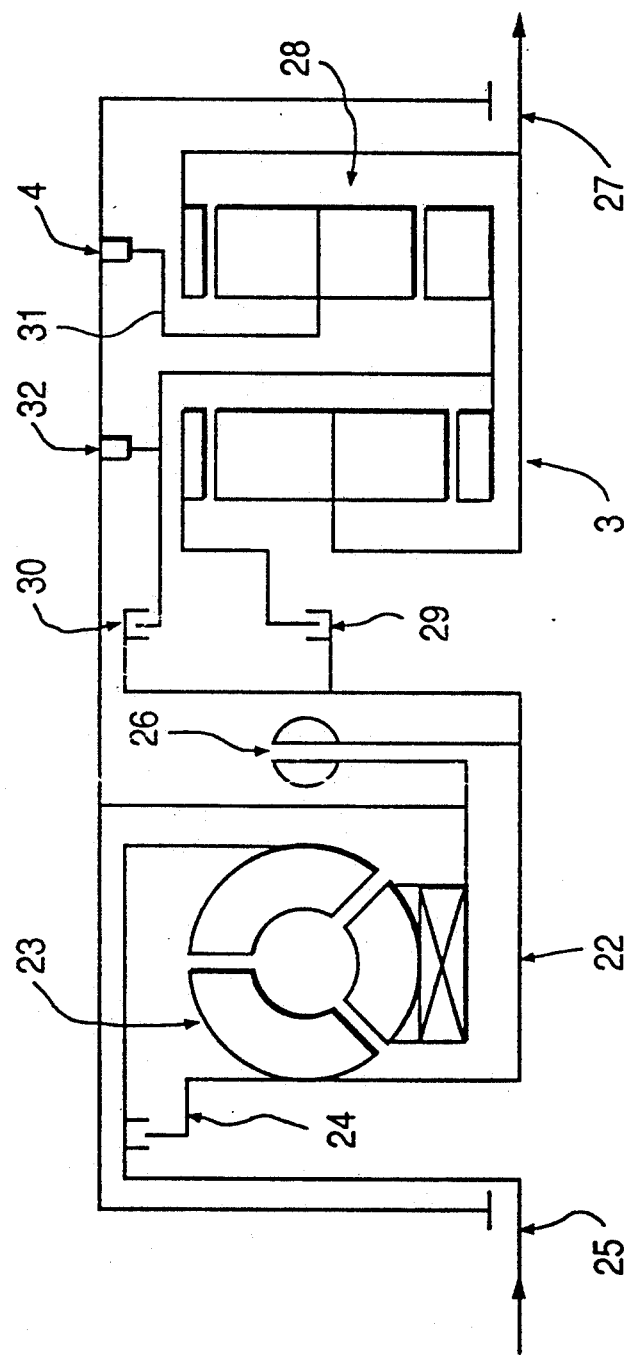
FIG. 1 is a schematic view of a gearbox construction of an epicyclic change-speed gearbox of an omnibus with a gear brake for the first gear.

Referring now to FIG. 1, an input shaft 22 of an epicyclic change-speed gearbox 3 can be driven by the crankshaft 25 of a driving engine via a hydrodynamic torque converter 23 with a lock-up clutch 24 and can be braked, if required, by a hydrodynamic brake 26.

The change-speed gearbox 3 has an output shaft 27 in a drive connection, in a conventional manner, with the rear axle drive of the omnibus. The output shaft 27 can be brought into drive connection with the input shaft 22 by a known Simpson gearbox 28 by way of a drive clutch 29 engaged in the forward gears and a drive clutch 30 engaged in the reverse gear.

The rear planet carrier 31 of the Simpson gear 28 is connected by way of a gear brake 4 for the first gear and the reverse gear. The inner central wheels of the Simpson gearbox 28 are connected both to the drive clutch 30 and to a gear brake 32 for the second gear. In the direct third gear, the gear brakes 4 and 32 are disengaged, and the drive clutches 29 and 30 are engaged.

Figure 2:
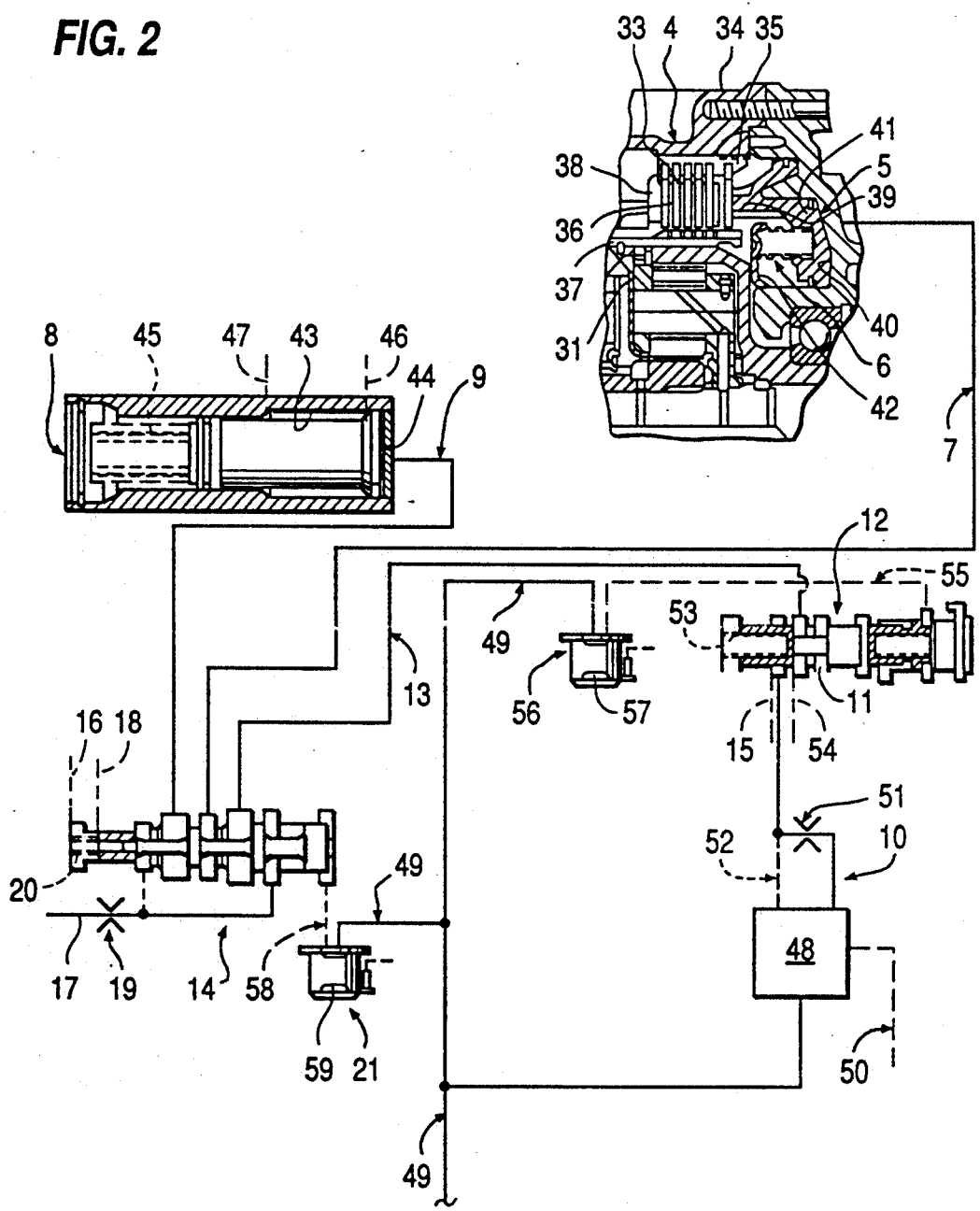
FIG. 2 is a schematic view of a selector device according to the present invention for selecting the gear brake for the first gear of FIG. 1.

The gear brake 4 is configured as a plate brake whose outer plates 33 are guided, so that they are rotationally fixed and axially displaceable, in axial grooves 35 of the gearbox casing 34 as shown in FIG. 2. The inner plates 36 of the gear brake 4 are guided so that they are rotationally fixed and axially displaceable on a cylindrical inner plate carrier 37 which is connected to the planet carrier 31 in a rotationally fixed manner. The plate pack 33, 36 is located between an abutment 38 of the gearbox casing 34 and an annular pressure piece 39. The pressure piece 39 can be actuated in the engagement direction by a pressure medium selector setting element 5 of the axial piston type and, in the disengagement direction, by return springs 6.

The selector setting element 5 has a working pressure chamber 40 provided in the gearbox casing 34, and this working pressure chamber 40 accommodates a working piston 41 so that it can be displaced. The disengagement springs 6 are supported at one end on the working piston 41 configured integrally with the pressure piece 39 and, at the other end, on an abutment 42 held in the gearbox casing 34. The working pressure chamber 40 is connected to a 5/2-way disengagement control valve designated generally by numeral 14 by way of a working pressure conduit 7.

A pressure reservoir 8 has a reservoir chamber 43 which is connected to the disengagement control valve 14 via a reservoir pressure conduit 9. A reservoir piston 44 is accommodated in the reservoir chamber 43 and can be displaced from an extended position 46 into a retracted position 47 against the action of a spring device 45. The volume of the reservoir chamber 43 occurring in the retracted position 47 of the reservoir piston 44 is matched to the volume of the working pressure chamber 40 in the engaged position of the axial piston 41 such that the working piston 41, when the working pressure conduit 7 is connected to the reservoir pressure conduit 9 via the disengagement control valve 14, can only be pushed back to such an extent that the friction plates 33, 36 are just unloaded and transmit no torque.

A 3/2-way selector valve designated generally by numeral 12 is connected to a controller pressure conduit 10, to a pressure-relieved return 11 and to a working pressure intermediate conduit 13. The controller pressure conduit 10 starts from a pressure control device 48 which is fed by a main pressure conduit 49 and operates, inter alia, as a function of a load-dependent modulating pressure of a modulating pressure controller conduit 50 (shown in dashed lines). A throttle 51 is located in the control pressure conduit 10, and a control pressure conduit 52 connected to the pressure control device 48 branches off from the section of the controller pressure conduit 10 located between the selector valve 12 and the throttle 51.

The selector valve 12 can be actuated by a spring device 53 into its illustrated switch-off position 54, in which the controller pressure conduit 10 is shut off and the intermediate conduit 13 is connected to the return 11. The selector valve 12 can be switched by the control pressure of a control pressure conduit 55 (shown in dashed lines) into a gear position 15 in which the return 11 is shut off and the intermediate conduit 13 is connected to the controller pressure conduit 10. The control pressure conduit 55 leads to an electromagnetic 3/2-way pilot valve 56 which is fed by the main pressure conduit 49 and has a pressure-relieved return 57. In the illustrated non-excited or rest position of the pilot control valve 56, the main pressure conduit 49 is shut off, and the control pressure conduit 55 is connected to the return 57. In the excited position of the pilot control valve 56, the control pressure conduit 55 is connected to the main pressure conduit 49, and the return 57 is shut off.

The disengagement control valve 14 can be actuated by a spring device 20 into its illustrated gear position 18, in which the reservoir pressure conduit 9 is connected to a return 17, the working pressure conduit 7 is connected to an intermediate conduit 13, and the return 17 is shut off from the intermediate conduit 13. The disengagement control valve 14 can be switched by the control pressure of a control pressure conduit 58 into a disengaged position 16 in which the working pressure conduit 7 is shut off from the intermediate conduit 13 and is connected to the reservoir pressure conduit 9, whereas the return 17 is shut off from the reservoir pressure conduit 9 and is connected to the intermediate conduit 13. A throttle 19 is arranged so as to take effect between the return 17 and the disengagement control valve 14. The control pressure conduit 58 leads to a 3/2-way pilot control valve 21 which is supplied by the main pressure conduit 49 and has a pressure-relieved return 59. In the illustrated non-excited position of the pilot control valve 21, the main pressure conduit 49 is shut off and the control pressure conduit 58 is connected to the return 59. In the excited position of the pilot control valve 21, the control pressure conduit 58 is connected to the main pressure conduit 49 and the return 59 is shut off.

In first to third gear and in reverse gear, the pilot control valve 21 is without current, i.e. unenergized, and the disengagement control valve 14 is located in the illustrated gear position 18. The intermediate conduit 13 is connected to the selector setting element 5, via the working pressure conduit 7, so that the control functions in all the gear selection positions with the exception of the "neutral" selection condition. The reservoir pressure conduit 9 is unpressurized because of the disengagement control valve and the throttle 19. The pressure reservoir, or the reservoir piston 44, is therefore in the extended position (indicated by dot-dash lines).

In first gear, the pilot control valve 56 is excited, and the selector valve is actuated into the gear position 15 against the spring force 53. This connects the intermediate conduit 13, and therefore also the selector setting element 5, to the controller pressure conduit 10. The working piston 41 then presses the friction plates 33, 36 together. When "neutral" is selected, the pilot control valve 56 remains excited, and the pilot control valve 21 is also excited. As a result, the disengagement control valve 14 is actuated into the disengagement position 16 indicated by dot-dash lines against the force of spring device 20 and, therefore, connects the working pressure conduit 7 to the pressure reservoir 8. Consequently, oil can flow from the working pressure chamber 40 of the selector setting element 5 into the pressure reservoir whose reservoir piston 44 moves into its retracted position 47 (dot-dash lines), whereas the working piston 41 of the selector setting element 5 is pressed to the right by the return springs 6.

When first gear is reselected, the excitation of the pilot control valve 21 is switched off so that the disengagement control valve 14 is actuated into the gear position 18 by the spring 20. Thereby, the working pressure chamber 40 of the selector setting element 5 is connected to the intermediate conduit 13 so that the working piston 41 comes in contact again immediately.

A particular advantage of the present invention resides in the fact that, in the neutral selection condition, the intermediate conduit 13 is connected to the return 17 via the disengagement control valve 14 so that oil continuously drains from the controller pressure conduit 10 via the throttle 19 into the return 17. As a result, the pressure behind the throttle 51 in the control pressure conduit 52 falls so that the pressure control device 48 is triggered into its control condition, and, consequently, a load-dependent controlled working pressure is immediately available when the gear brake 4 is reselected.

This triggering function of the control pressure conduit 52 always occurs when the gear brake is engaged because the conduit volume occurring behind the throttle 51 is increased by, among other things, the volume of the working pressure chamber 40 when the selector valve 12 is switched over.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. An automatic selector device of an epicyclic change-speed gearbox for a motor vehicle, comprising a pressure medium selector setting element of the axial piston type, for engaging a frictional connection constituting one of clutch and brake participating in the selection of a gear, spring means for disengaging the frictional connection to ensure a clearance between friction surfaces in the rest condition, a pressure reservoir, a 3/2-way selector valve, and a working pressure conduit from the selector setting element, a reservoir pressure conduit from a pressure reservoir, a working pressure intermediate conduit from the 3/2-way selector valve connected to a controller pressure conduit and a pressure-relieved return, said working pressure conduit, said working pressure intermediate conduit and said pressure-relieved returns being connected to a disengagement control valve, the intermediate conduit being configured to be connected to a controller pressure conduit in a gear position of the selector valve associated with the selection of the gear and is connected to the return in a deselection position of the selector valve corresponding to deselection of the gear, and the working pressure conduit is connected to the intermediate conduit in one position of the disengagement control valve and is shut off from the intermediate conduit in another position of the disengagement control valve, wherein, in a neutral selection condition cancelling torque transmission in the change-speed gearbox, the selector valve is configured to be a gear position and the disengagement control valve is configured to be a disengagement position shutting off the working pressure conduit from the intermediate conduit, with the disengagement control valve still connected to a pressure-relieved return and, via the working pressure conduit, exclusively connected to the selector setting element and, via the reservoir pressure conduit, exclusively connected to the pressure reservoir, and with the reservoir pressure conduit connected to the working pressure conduit in the disengagement position of the disengagement control valve but is connected to the second return in a gear position of the disengagement control valve and the volume of the pressure reservoir is matched to the volume, occurring in the engaged position, of a working pressure chamber of the selector setting element such that, when the working pressure conduit is connected to the reservoir pressure conduit via the disengagement control valve, the selector setting element can only be disengaged to the extent that the frictional connection is just unloaded and does not transmits torque.

2. The automatic selector device according to claim 1, wherein the intermediate conduit is configured to be connected to the second return in the disengagement position of the disengagement control valve.

3. The automatic selector device according to claim 1, wherein a throttle is operatively located between the second return and the disengagement control valve.

4. The automatic selector device according to claim 1, wherein the disengagement control valve is a 5/2-way valve.

5. The automatic selector device according to claim 1, wherein the disengagement control valve is configured to be actuated into the gear position by spring apparatus.

6. The automatic selector device according to claim 1, wherein an electromagnetic 3/2-way pilot control valve is arranged to service the disengagement control valve into the disengagement position.

* * * * *